(12) United States Patent
Cui et al.

(10) Patent No.: US 11,613,862 B2
(45) Date of Patent: Mar. 28, 2023

(54) WATER SURFACE GARBAGE SALVAGING DEVICE

(71) Applicant: JIANGSU UNIVERSITY OF SCIENCE AND TECHNOLOGY, Zhenjiang (CN)

(72) Inventors: Jie Cui, Zhenjiang (CN); Chunyan Ji, Zhenjiang (CN); Renchuan Ye, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 17/414,875

(22) PCT Filed: Nov. 12, 2020

(86) PCT No.: PCT/CN2020/128237
§ 371 (c)(1),
(2) Date: Jun. 16, 2021

(87) PCT Pub. No.: WO2021/098575
PCT Pub. Date: May 27, 2021

(65) Prior Publication Data
US 2022/0275594 A1    Sep. 1, 2022

(30) Foreign Application Priority Data

Nov. 19, 2019   (CN) .......................... 201911131025.4

(51) Int. Cl.
*E02B 15/10*   (2006.01)
*B01D 33/01*   (2006.01)
(Continued)

(52) U.S. Cl.
CPC ........ *E02B 15/104* (2013.01); *B01D 33/0183* (2013.01); *B01D 33/15* (2013.01);
(Continued)

(58) Field of Classification Search
CPC ...... E02B 15/046; E02B 15/10; E02B 15/103; E02B 15/104; B01D 29/96; B01D 33/0183; B01D 33/15; B01D 33/155
(Continued)

(56) References Cited

U.S. PATENT DOCUMENTS

| | | | | |
|---|---|---|---|---|
| 3,268,081 A | * | 8/1966 | Menkee | E02B 15/046 210/242.1 |
| 3,326,379 A | * | 6/1967 | Caddick | E02B 15/046 210/242.1 |
| 4,363,735 A | * | 12/1982 | Hook | E02B 15/00 210/776 |
| 4,477,349 A | * | 10/1984 | Monteyne | B01D 33/155 210/394 |

(Continued)

FOREIGN PATENT DOCUMENTS

WO    WO 2004/076750    *    9/2004

*Primary Examiner* — Christopher Upton
(74) *Attorney, Agent, or Firm* — CBM Patent Consulting, LLC

(57) ABSTRACT

A water surface garbage salvaging device, comprising a demihull, a large garbage salvaging device and a small garbage cleaning device; wherein the large garbage salvaging device is arranged on a front portion of the demihull, and the small garbage cleaning device is arranged on a rear portion thereof; the large garbage salvaging device comprises a paddle wheel, slipways and a large garbage storage bin; and the small garbage cleaning device comprises a filter mesh, a guide rail slider mechanism, a lifting mechanism and a pulley system, a hanging bracket is arranged above the filter mesh.

10 Claims, 4 Drawing Sheets

(51) Int. Cl.
    *B01D 33/15*     (2006.01)
    *C02F 1/00*     (2023.01)
    *C02F 1/40*     (2023.01)
    *C02F 103/00*     (2006.01)

(52) U.S. Cl.
    CPC ............ *B01D 33/155* (2013.01); *C02F 1/001* (2013.01); *C02F 1/40* (2013.01); *E02B 15/10* (2013.01); *C02F 2103/007* (2013.01); *C02F 2201/009* (2013.01); *C02F 2209/03* (2013.01); *C02F 2209/40* (2013.01)

(58) Field of Classification Search
    USPC ...... 210/170.05, 170.09, 170.11, 242.1, 388, 210/394, 776
    See application file for complete search history.

(56) References Cited

U.S. PATENT DOCUMENTS

| | | | |
|---|---|---|---|
| 5,173,182 A * | 12/1992 | Debellian | E02B 15/046 |
| | | | 210/242.1 |
| 9,493,215 B2 * | 11/2016 | Horton | E02B 15/104 |
| 10,323,376 B1 * | 6/2019 | Nickelson | E02B 15/10 |
| 11,001,352 B1 * | 5/2021 | Nassim | E02B 15/104 |
| 2006/0032798 A1 * | 2/2006 | DePaso | E02B 8/085 |
| | | | 210/170.09 |
| 2007/0158253 A1 * | 7/2007 | Kellett | E02B 15/104 |
| | | | 210/242.1 |
| 2008/0296235 A1 * | 12/2008 | Murray | B01D 21/2433 |
| | | | 210/776 |
| 2012/0055856 A1 * | 3/2012 | Ratti | E02B 15/104 |
| | | | 210/242.1 |

* cited by examiner

WATER SURFACE GARBAGE SALVAGING DEVICE

TECHNICAL FIELD

The present invention relates to the field of water surface garbage salvaging, in particular to a water surface garbage salvaging device.

BACKGROUND

Due to human production activities, a large number of man-made objects flow into the ocean to form marine garbage, which affects marine landscape and marine ecosystem. Marine garbage cleaning is an important development direction of marine industry in the future. A manual salvage, the current main salvaging mode, is used at where water surface garbage gathers such as rivers and coastal areas, which is characterized as laborious and inefficient. Some cleaning robots with autonomous salvaging functions also have such defects as low salvaging speed and low garbage loading capacity.

However, the efficiency of a fully automatic water surface garbage collecting device is still several times or tens of times of that of the manual salvage without consideration on a loading capacity. How to effectively improve garbage loading capacity by optimizing garbage storage mode, and how to improve garbage cleaning efficiency by changing salvaging mode are the important research directions of surface garbage cleaning.

SUMMARY

Objective: the present invention aims to provide a water surface garbage salvaging device to improve garbage salvaging efficiency and garbage loading efficiency.

Technical solution: the water surface garbage salvaging device provided herein comprises a demihull, a large garbage salvaging device, a small garbage cleaning device and a central controller; wherein the large garbage salvaging device is arranged on a front portion of the demihull, and the small garbage cleaning device is arranged on a rear portion thereof; the large garbage salvaging device comprises a paddle wheel, slipways and a large garbage storage bin, the slipways are arranged on two sides of the paddle wheel separately, the slipways are connected with the large garbage storage bin; and the small garbage cleaning device is arranged behind the large garbage salvaging device, the small garbage cleaning device comprises a filter mesh, a guide rail slider mechanism, a lifting mechanism and a pulley system, a hanging bracket is arranged above the filter mesh, the lifting mechanism and the pulley system are arranged on two sides of the filter mesh, two ends of the hanging bracket are arranged on the lifting mechanism separately and the middle thereof is connected with the filter mesh, one end of a rope of the pulley system is tied to the lifting mechanism and the other end thereof is tied to the filter mesh, the guide rail slider mechanism is arranged between the filter mesh and the hanging bracket, and garbage storage bins are installed below two ends of a stroke of the guide rail slider mechanism.

The paddle wheel comprises a stator and a rotor, the rotor comprises a hub and fan blades, the stator is concentrically fitted with a hub of the rotor, a portion of the stator above a waterline adopts a closed ramp structure, the ramp is communicated with the slipways, and a gap is provided on a portion of the stator below the waterline, so that tiny garbage can flow through the gap conveniently.

The fan blades are in a form of a filter mesh having openings of 1 to 3 mm, and most of tiny garbage can be effectively filtered.

A compression device is arranged above the large garbage storage bin, and the compression device adopts a gear rack mechanism.

A pressure sensor is arranged on a bottom portion of the large garbage storage bin, and infrared sensors are arranged on two sides of an upper portion thereof.

The guide rail slider mechanism comprises a lead screw guide rail and a slider, the lead screw guide rail comprises an optical shaft and a screw, two ends of the lead screw guide rail are fixed with the demihull, and the screw is connected with a motor.

A cleaning brush is arranged on the slider, and the garbage storage bins are arranged below two ends of a stroke of the cleaning brush.

A flow meter is arranged behind the filter mesh for detecting flow velocity.

A top portion of the hanging bracket is fixed with a solar panel for powering a control system.

A power supply and a central controller are installed within the demihull.

Beneficial effects: the small garbage cleaning device described herein mainly collects floating objects on the water surface or in shallow ponds, the filter mesh described herein has openings of 1 to 3 mm that can effectively filter most of tiny garbage such as small-particle foams and aquatic organisms such as *Enteromorpha*, and the large garbage salvaging device mainly collects floating objects such as mineral water bottles, pop-top cans, foam blocks that are light in weight and convenient to compress but occupy large space; the water surface garbage salvaging device of the present invention has been optimized for being installed on an unmanned catamaran, can realize autonomous salvage and recycling by path planning, and can also be installed at fixed positions such as shores; the present invention provides a novel solution for large garbage and small garbage sorting and salvaging, which has the benefits of high automation, wide salvaging target range, high cleaning efficiency, improved garbage storage efficiency, being convenient to recover the storage and the like; additionally, the water surface garbage salvaging device of the present invention can realize program autonomy and good garbage salvaging effect, can perform manual salvaging in designated positions, has safety, reliability and higher efficiency, can effectively replace manual salvaging, effectively improves storage efficiency and recovery efficiency due to classified salvaging on garbage, and has a good human-machine interaction function.

DETAILED DESCRIPTION

The present invention is further described below with reference to the drawings.

Figure 1:
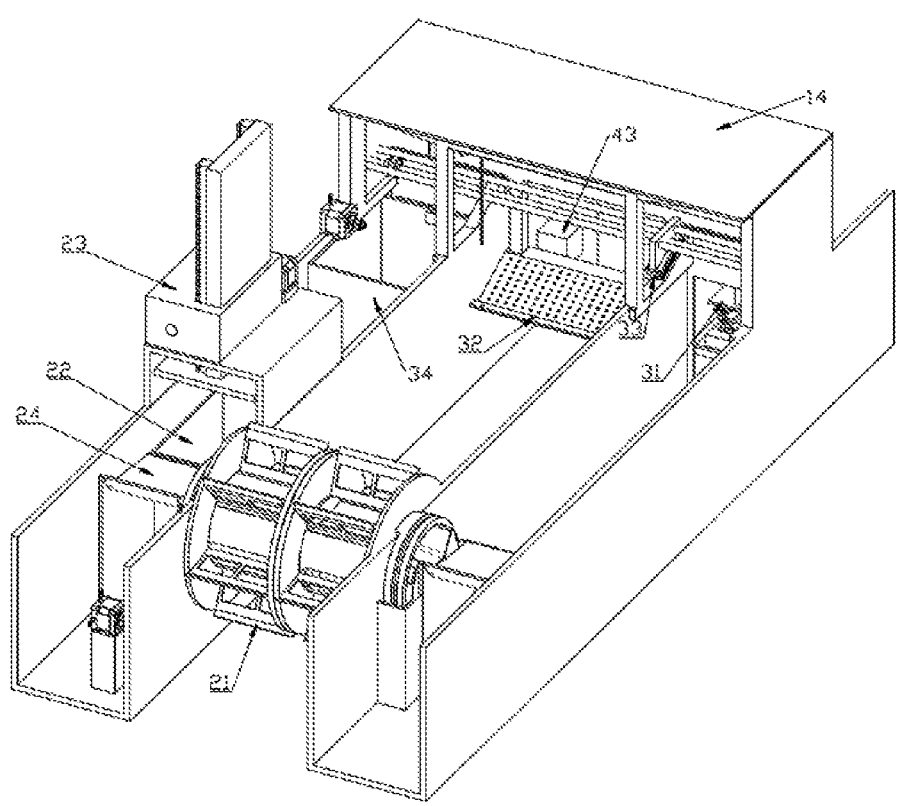
FIG. 1 is a schematic diagram of an overall structure according to the present invention.

As shown in FIGS. 1 to 6, the water surface garbage salvaging device provided herein comprises a demihull, a large garbage salvaging device, a small garbage cleaning device and a central controller 11, wherein the large garbage salvaging device is arranged on a front portion of the demihull, and the small garbage cleaning device is arranged on a rear portion thereof. As shown in FIG. 1, the large garbage salvaging device comprises a paddle wheel 21, slipways 24 and a large garbage storage bin 22, wherein the slipways 24 and large garbage storage bin 22 are respectively arranged on a left side and a right side of the paddle wheel 21.

Figure 4:
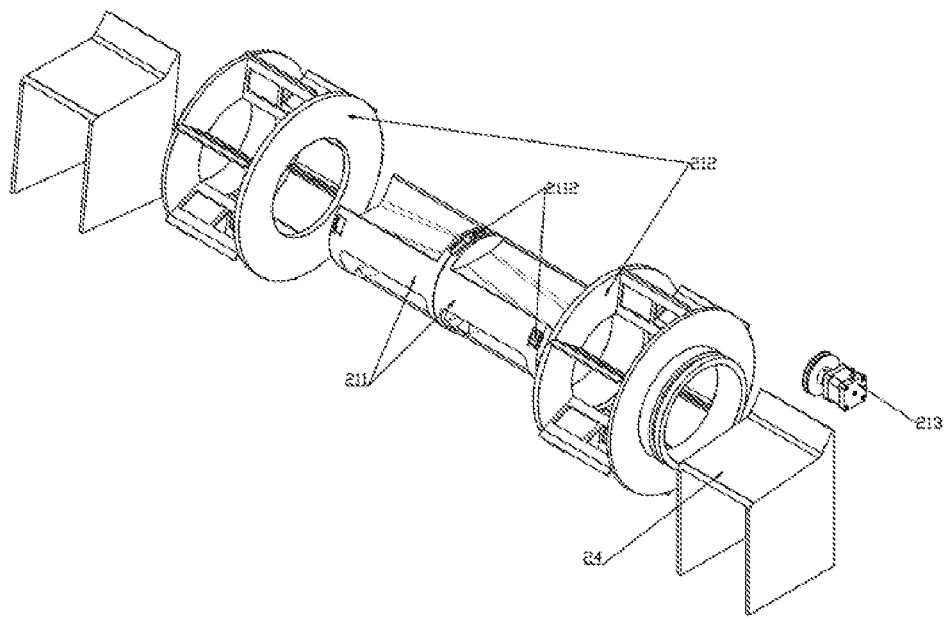
FIG. 4 is a schematic diagram of a large garbage salvaging device according to the present invention.
Figure 5:
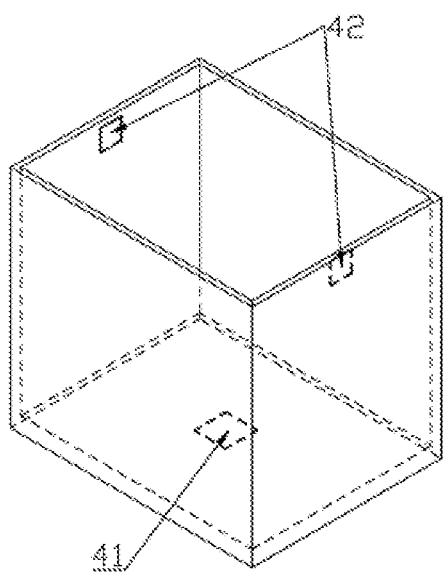
FIG. 5 is an arrangement diagram of a garbage storage bin sensor according to the present invention.

As shown in FIG. 4, the paddle wheel 21 comprises a stator 211 and a rotor 212, the rotor 212 is composed of a hub and fan blades, the fan blades are processed into a filter mesh with larger openings and generally with the number of 6 to 8, the hub is a general form of the paddle wheel, and the rotor 212 is driven with a pulley by a first motor 213 installed in the demihull. The stator 211 is concentrically fitted with the hub of the rotor 212 to support the rotor 212, and small slots are formed at both sides and a central region of the central axis of the stator 211, and rollers 2112 are installed in the slots to support the rotation of the rotor 212 of the paddle wheel. A portion of the stator 211 above a waterline is closed and formed angled internal ramps at both sides, so that large garbage can slip into the large garbage storage bin 22 from the fan blades along the slipways 24 by gravity, and the ramp at each side is enhanced to ensure the strength thereof. A larger gap is provided on the immersed portion of the stator 211, so that tiny garbage can flow through the gap conveniently. The paddle wheel 21 is arranged at a front portion of a waterway, the slipways 24 are arranged at two sides of the paddle wheel 21 and are connected with the paddle wheel 21 and the large garbage storage bin 22, a garbage compression device 23 is arranged right above the large garbage storage bin 22, a bottom portion of the garbage compression device 23 is provided with a pressure sensor 41, and two sides of an upper portion of the garbage compression device 23 are provided with infrared sensors 42, as shown in FIG. 5.

Figure 6:
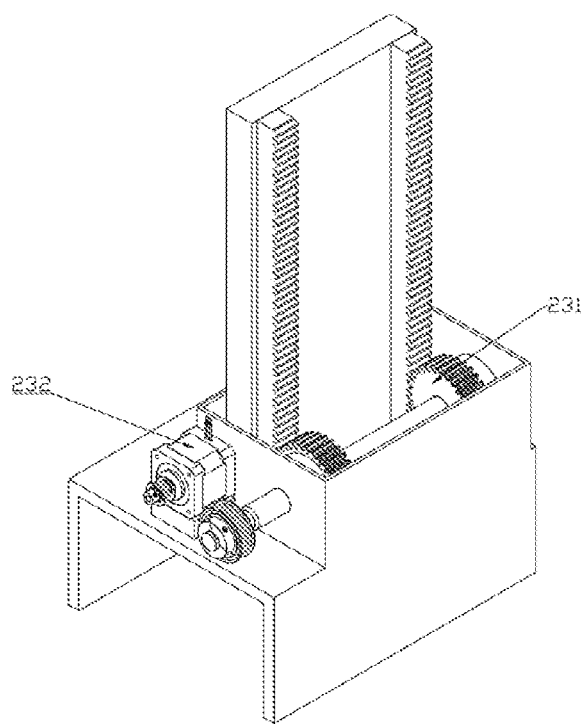
FIG. 6 is a schematic view of a garbage crusher according to the present invention.

The compression device 23 adopts a gear rack mechanism driven by a second motor 232, as shown in FIG. 6. The central controller 11 determines whether the compression device 23 is used or not according to the pressure sensor 41 in the large garbage storage bin 22, and feeds back weight information to an upper computer in real time. The central controller 11 is connected with each motor driver and each sensor module, and is powered by a solar panel 14, and the motor are powered by an additional power source. The large garbage on the flowing water is salvaged by the fan blades and slips into the large garbage storage bin 22 along the slipways 24. Large space is always left in the storage bin when the large garbage is stored; when the weight of the collected garbage is detected by the pressure sensor 41 or the height thereof is detected by the infrared sensor 42 to reach a limit value, the second motor 232 drives a gear rack 231 under the control of the central controller 11, then the compression device compresses the large garbage; when the pressure sensor 41 reaches another limit value, the second motor 232 returns the compression device under the control of the central controller 11, and the garbage compression is completed. When the garbage bin is fully loaded, the central controller 11 will notify the upper computer to remind an operator to recycle the collected garbage.

Figure 2:
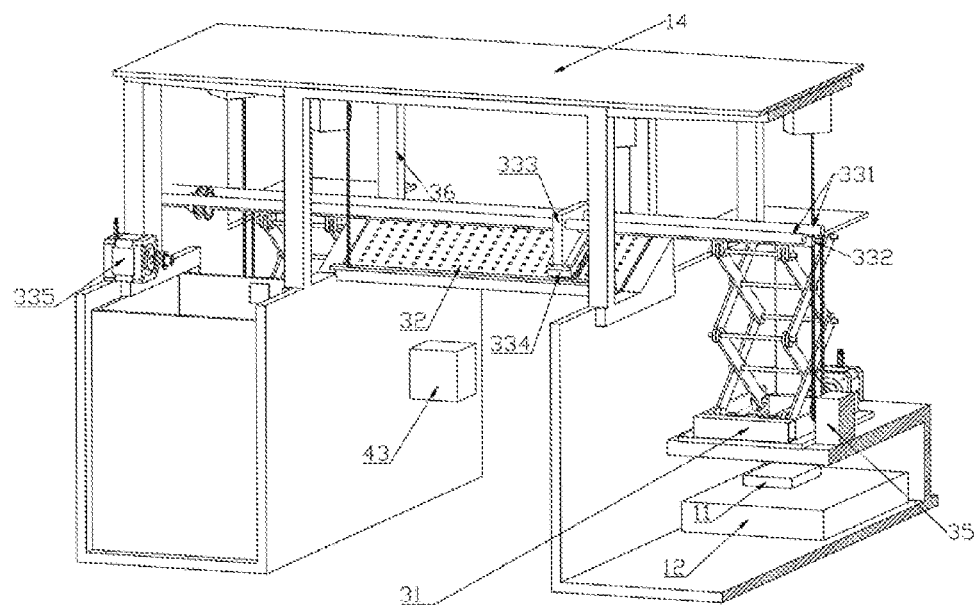
FIG. 2 is a schematic diagram of the lifting of a small garbage cleaning device according to the present invention.
Figure 3:
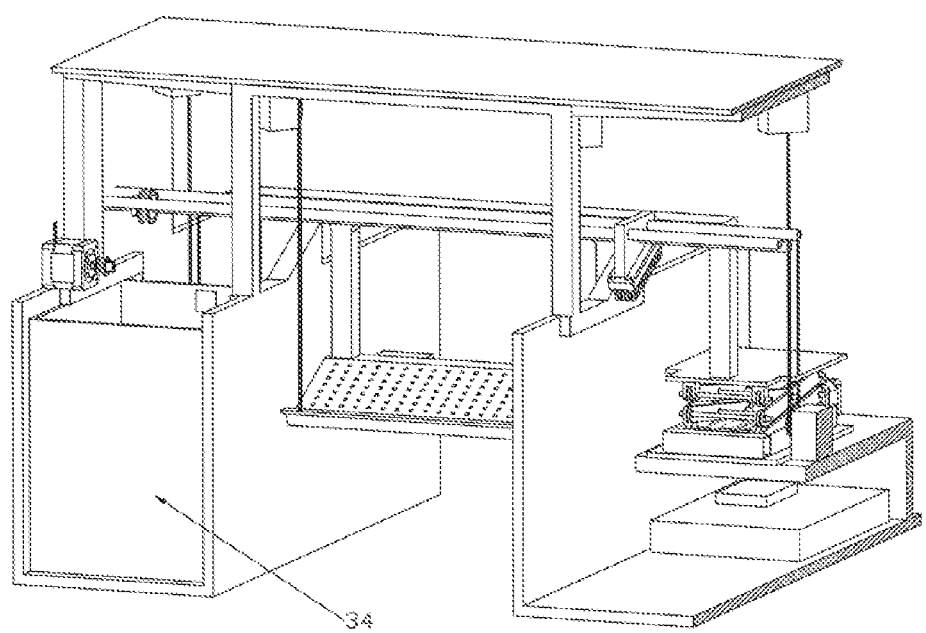
FIG. 3 is a schematic diagram of the dropping of a small garbage cleaning device according to the present invention.

As shown in FIG. 2 and FIG. 3, the small garbage cleaning device comprises a filter mesh 32, a guide rail slider mechanism, a lifting mechanism 31, a door-shaped hanging bracket 36 for connecting the filter mesh 32 and the lifting mechanism 31, and a pulley system 35. The filter mesh 32 is made of stainless steel, is processed to be connected with the hanging bracket 36 and ropes of the pulley system 35, and is arranged at a position behind a middle portion of a waterway. Each of two sides of the filter mesh 32 is provided with a lifting mechanism 31, two synchronous lifting mechanisms adopt a scissor-type platform mechanism and are driven by a pair of stepping motors 335, the lifting mechanisms 31 are arranged at a back position relative to the filter mesh 32 on both sides of the demihull, two ends of the door-shaped hanging bracket 36 are installed on a deck of the lifting mechanisms 31, a middle portion of the hanging bracket is connected with the filter mesh 32, one end of a rope of the pulley system 35 is tied to the deck of the lifting mechanisms 31, and the other end thereof is tied to the filter mesh 32. When the lifting mechanisms are lifted, both sides of the filter mesh 32 are lifted by the hanging bracket 36 and the rope, avoiding generating great moment of force. Additionally, a flow meter 43 is arranged behind the filter mesh 32, and sends data to the central controller 11. The guide rail slider mechanism is arranged right above the filter mesh 32 and comprises a lead screw guide rail and a slider 333, the lead screw guide rail is composed of an optical shaft 331 and a screw 332 which are across a middle part of a waterway, a cleaning brush 334 is arranged on a bottom portion of the slider 333, two ends of the lead screw guide rail are installed on two sides of the demihull, the screw 332 is driven by a motor to drive the slider 333 to slide along the screw guide rail through a screw guide rail structure. The garbage storage bin 34 is arranged below each of two ends of a stroke of the cleaning brush 334. A top portion of the hanging bracket 36 is fixed with a solar panel 14 for powering the control system.

The small garbage cleaning device is arranged on a rear portion of the large garbage salvaging device, and filters the small garbage that large garbage salvaging device fails to collect to filter mesh 32; when the flow meter 43 behind the filter mesh 32 detects a large percentage reduction in flow velocity, the central controller 11 controls stepping motors 335 to drive the lifting mechanisms to drive filter mesh 32 to lift, the motor on the screw guide rail is then started to drive the cleaning brush 334 to push from one side of the filter mesh 32 to the other side, thereby pushing the garbage on the filter mesh 32 into the garbage storage bin 34.

The solar panels 14 convert solar energy to electrical energy, some of which is stored in an additional power source dedicated to the control system, and the primary power source 12 supplies power to other components of the system. The paddle wheel 21 continuously works to push the large garbage into the large garbage storage bin 22, the central controller 11 determines whether the compression device 23 is started or not according to the pressure sensor 41 in the large garbage storage bin 22, determines in real time whether the compression limit is reached or not according to the pressure in the compression process; if yes, the compression device 23 is reset, an infrared sensor 42 is arranged on a top portion of the large garbage storage bin 22, and the controller determines whether the bin is in a full-load state or not according to an infrared feedback signal and then informs the upper computer. The flow meter 43 is arranged behind the filter mesh 32 of the small garbage cleaning device, the flow velocity of water behind the filter mesh 32 can change according to the garbage adhesion amount on the filter mesh 32, and the controller determines the time for lifting the filter mesh 32 and starting other mechanisms of the small garbage cleaning device according to flow velocity feedback information.

When the water surface garbage salvaging device is used, the central controller 11 controls the first motor 213 driving the paddle wheel 21 to periodically operate, continuously salvaging large garbage; when a pressure gauge in the large garbage storage bin 22 reaches a certain limit value, the garbage compressor is started to compress garbage, and when the pressure gauge reaches another larger limit value, the garbage compressor is reset; the controller controls the lifting mechanisms, the flow meter 43 behind the filter mesh determines whether enough garbage is filtered or not, if yes, the filter mesh 32 is lifted, the motor for controlling the lead screw guide rail is operated to push garbage into the garbage storage bins 34 at two sides; when the central controller 11 determines that the bin is in a full-load state according to the data fed back by the infrared and pressure sensors, a signal is sent to the upper computer to remind an operator to recycle the garbage; additionally, the mechanism reserves super user permission, sensor data are transmitted back in real time, and all devices can be controlled by the upper computer, so that an operator can conveniently and accurately salvage or avoid water flow. Most functions of the water surface garbage salvaging system have automatic programs, so that the automatic garbage salvaging can be realized; the salvaging system has high efficiency and reduced labor cost, and is safe and reliable due to enough electric energy provided by the solar energy ensuring the connection of the system.

What is claimed is:

1. A water surface garbage salvaging device, comprising a demihull, a large garbage salvaging device, a small garbage cleaning device and a central controller; wherein the large garbage salvaging device is arranged on a front portion of the demihull, and the small garbage cleaning device is arranged on a rear portion thereof; the large garbage salvaging device comprises a paddle wheel, slipways and a large garbage storage bin, the slipways are arranged on two sides of the paddle wheel separately, and the slipways are connected with the large garbage storage bin; and the small garbage cleaning device is arranged behind the large garbage salvaging device, the small garbage cleaning device comprises a filter mesh, a guide rail slider mechanism, a lifting mechanism and a pulley system, a hanging bracket is arranged above the filter mesh, the lifting mechanism and the pulley system are arranged on two sides of the filter mesh, two ends of the hanging bracket are arranged on the lifting mechanism separately and the middle thereof is connected with the filter mesh, one end of a rope of the pulley system is tied to the lifting mechanism and the other end thereof is tied to the filter mesh, the guide rail slider mechanism is arranged between the filter mesh and the hanging bracket, and garbage storage bins are installed below two ends of a stroke of the guide rail slider mechanism.

2. The water surface garbage salvaging device according to claim 1, wherein the paddle wheel comprises a stator and a rotor, the rotor comprises a hub and fan blades, the stator is concentrically fitted with a hub of the rotor, a portion of the stator above a waterline adopts a closed ramp structure, the ramp is communicated with the slipways, and a gap is provided on a portion of the stator below the waterline.

3. The water surface garbage salvaging device according to claim 2, wherein the fan blades are in a form of a filter mesh.

4. The water surface garbage salvaging device according to claim 1, wherein a compression device is arranged above the large garbage storage bin, and the compression device adopts a gear rack mechanism.

5. The water surface garbage salvaging device according to claim 1, wherein a pressure sensor is arranged on a bottom portion of the large garbage storage bin, and infrared sensors are arranged on two sides of an upper portion thereof.

6. The water surface garbage salvaging device according to claim 1, wherein the guide rail slider mechanism comprises a lead screw guide rail and a slider, the lead screw guide rail comprises an optical shaft and a screw, two ends of the lead screw guide rail are fixed with the demihull, and the screw is connected with a motor.

7. The water surface garbage salvaging device according to claim 6, wherein a cleaning brush is arranged on the slider, and the garbage storage bins are arranged below two ends of a stroke of the cleaning brush.

8. The water surface garbage salvaging device according to claim 1, wherein a flow meter is arranged behind the filter mesh.

9. The water surface garbage salvaging device according to claim 1, wherein a top portion of the hanging bracket is fixed with a solar panel.

10. The water surface garbage salvaging device according to claim 1, wherein a power supply and a central controller are installed within the demihull.

\* \* \* \* \*